United States Patent
Kelly et al.

(10) Patent No.: US 9,193,149 B2
(45) Date of Patent: Nov. 24, 2015

(54) AQUEOUS INK JET BLANKET

(71) Applicant: Xerox Corporation, Norwalk, CT (US)

(72) Inventors: Matthew Michael Kelly, West Henrietta, NY (US); Srinivas Mettu, Essendon (AU); Anthony Salvatore Condello, Webster, NY (US); Santokh S. Badesha, Pittsford, NY (US); Mandakini Kanungo, Penfield, NY (US); David Joseph Gervasi, Pittsford, NY (US); Chu-heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/165,897

(22) Filed: Jan. 28, 2014

(65) Prior Publication Data
US 2015/0210065 A1    Jul. 30, 2015

(51) Int. Cl.
*B41J 2/01* (2006.01)
*B41J 2/005* (2006.01)
*C08K 3/08* (2006.01)
*C08K 3/04* (2006.01)
*C08K 3/22* (2006.01)

(52) U.S. Cl.
CPC ............. *B41J 2/0057* (2013.01); *C08K 3/04* (2013.01); *C08K 3/08* (2013.01); *C08K 3/22* (2013.01); *C08K 2003/085* (2013.01); *C08K 2003/0812* (2013.01); *C08K 2003/0856* (2013.01)

(58) Field of Classification Search
USPC .......................................... 347/103
See application file for complete search history.

(56) References Cited

U.S. PATENT DOCUMENTS

| | | | |
|---|---|---|---|
| 5,099,256 A * | 3/1992 | Anderson | 347/103 |
| 5,753,307 A | 5/1998 | Badesha et al. | |
| 6,479,158 B1 | 11/2002 | Kuntz et al. | |
| 2003/0234841 A1* | 12/2003 | Pan et al. | 347/84 |
| 2006/0038869 A1 | 2/2006 | Pan et al. | |
| 2006/0152566 A1 | 7/2006 | Taniuchi et al. | |
| 2011/0142508 A1* | 6/2011 | Qi et al. | 399/333 |
| 2012/0261182 A1* | 10/2012 | Megaridis et al. | 174/388 |

OTHER PUBLICATIONS

U.S. Appl. No. 13/716,889, Office Action dated Aug. 8, 2014, 9 pages.
U.S. Appl. No. 13/716,889, Notice of Allowance dated Nov. 26, 2014, 10 pages.
U.S. Appl. No. 14/165,899, Office Action 1 dated Jun. 4, 2015, 16 pgs.
U.S. Appl. No. 14/203,667, Office Action 1 dated Jul. 16, 2015, 21 pgs.

* cited by examiner

*Primary Examiner* — Stephen Meier
*Assistant Examiner* — Alexander D Shenderov
(74) *Attorney, Agent, or Firm* — Hoffman Warnick LLC (57) ABSTRACT

There is described a transfer member or blanket for use in aqueous ink jet printer. The transfer member includes a surface layer that includes an elastomeric matrix having copper particles and carbon nanotubes dispersed therein. The weight percent of the copper particles in the surface layer is from about 1 weight percent to about 30 percent. The weight percent of the carbon nanotubes is from about 1 weight percent to about 10 weight percent.

20 Claims, 4 Drawing Sheets

LARGE DROPS LINES AND DOTS

– 100 MICRONS

FIG. 4

MEDIUM DROPS LINES AND DOTS

– 100 MICRONS

AQUEOUS INK JET BLANKET

BACKGROUND

1. Field of Use

This disclosure is generally directed to inkjet transfix apparatuses and methods. In particular, disclosed herein is a composition that improves the wetting and release capability of an aqueous latex ink in an ink jet printer.

2. Background

Inkjet systems in which a liquid or melt solid ink is discharged through an ink discharge port such as a nozzle, a slit and a porous film are used in many printers due to their characteristics such as small size and low cost. In addition, an inkjet printer can print not only paper substrates, but also on various other substrates such as textiles, rubber and the like.

During the printing process, various intermediate media (e.g., transfer belts, intermediate blankets or drums) may be used to transfer the formed image to the final substrate. In intermediate transfix processes, aqueous latex ink is inkjetted onto a transfer member or intermediate blanket where the ink film is dried with heat or flowing air or both. The dried image is subsequently transfixed on to the final paper substrate. For this process to operate properly, the transfer member or blanket has to satisfy two conflicting requirements—the first requirement is that ink has to spread well on the transfer member and the second requirement is that, after drying, the ink should release from the blanket. Since aqueous ink comprises a large amount of water, such ink compositions wet and spread very well on high energy (i.e., greater than 40 mJ/m$^2$) hydrophilic substrates. However, due to the high affinity to such substrates, the aqueous ink does not release well from these substrates. Silicone rubbers with low surface energy (i.e., about 20 mJ/m$^2$ or less) circumvent the release problem. However, a major drawback of the silicone rubbers is that the ink does not wet and spread on these substrates due to low affinity to water. Thus, the ideal transfer member for the transfix process would have both optimum spreading to form good quality image and optimum release properties to transfix the image to paper. While some solutions, such as adding surfactants to the ink to reduce the surface tension of the ink, have been proposed, these solutions present additional problems. For example, the surfactants result in uncontrolled spreading of the ink that causes the edges of single pixel lines to be undesirably wavy. Moreover, aqueous printheads have certain minimum surface tension requirements (i.e., greater than 20 mN/m) that must be met for good jetting performance.

Thus, there is a need for a way to provide the desired spreading and release properties for aqueous inks to address the above problems faced in transfix process.

SUMMARY

Disclosed herein is a transfer member for use in aqueous ink jet printer. The transfer member includes a surface layer that includes an elastomeric matrix having copper particles and carbon nanotubes dispersed therein. The weight percent of the copper particles in the surface layer is from about 1 weight percent to about 30 percent. The weight percent of the carbon nanotubes is from about 1 weight percent to about 10 weight percent.

There is provided an ink jet printer that includes a transfer member. The transfer member includes a surface layer including an elastomeric matrix having copper particles and carbon nanotubes dispersed therein. The weight percent of the copper particles in the surface layer is from about 1 weight percent to about 30 percent. The weight percent of the carbon nanotubes is from about 1 weight percent to about 10 weight percent.

Disclosed herein is an ink jet printer that includes a transfer member including a surface layer of an elastomeric matrix having copper particles and carbon nanotubes dispersed therein. The weight percent of the copper particles in the surface layer is from about 1 weight percent to about 30 percent. The weight percent of the carbon nanotubes is from about 1 weight percent to about 10 weight percent. The ink jet printer includes a print head adjacent the transfer member for ejecting aqueous ink droplets onto a surface of the transfer member to form an ink image. The ink jet printer includes a transfixing station located adjacent the transfer member and downstream from the print head, the transfixing station forming a transfixing nip with the transfer member at said transfixing station. The ink jet printer includes a transporting device for delivering a recording medium to the transfixing nip, wherein the ink image is transferred and fixed to the recording medium.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as a print medium or the surface of an intermediate member that carries an ink image, moves past the printheads in a process direction through the print zone. The inkjets in the printheads eject ink drops in rows in a cross-process direction, which is perpendicular to the process direction across the image receiving surface.

In a direct printer, the printheads eject ink drops directly onto a print medium, for example a paper sheet or a continuous media web. After ink drops are printed on the print medium, the printer moves the print medium through a nip formed between two rollers that apply pressure and, optionally, heat to the ink drops and print medium. One roller, typically referred to as a "spreader roller" contacts the printed side of the print medium. The second roller, typically referred to as a "pressure roller," presses the media against the spreader roller to spread the ink drops and fix the ink to the print medium.

Figure 1:
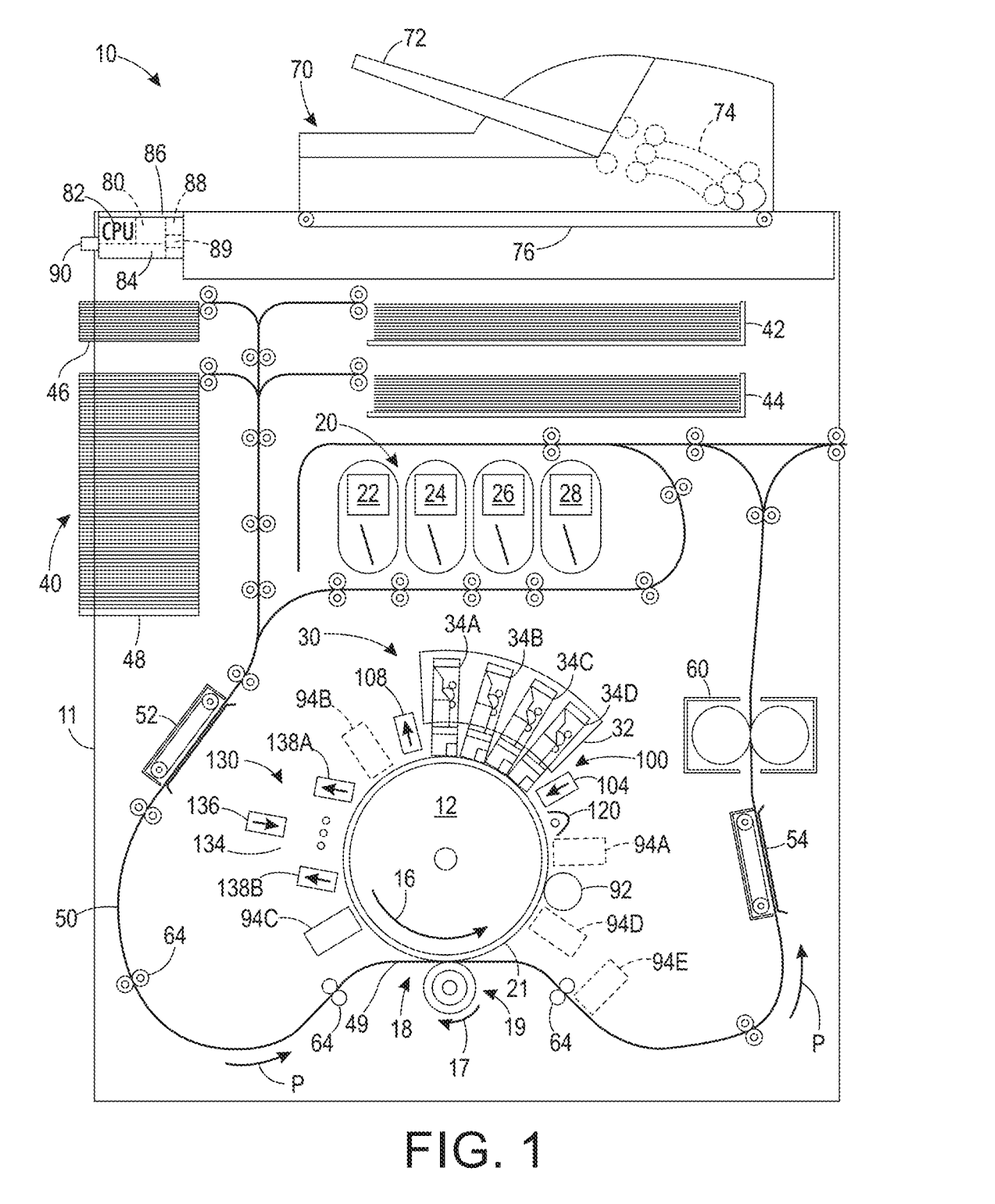
FIG. 1 is a schematic diagram illustrating an aqueous ink image printer.

FIG. 1 illustrates a high-speed aqueous ink image producing machine or printer 10. As illustrated, the printer 10 is an indirect printer that forms an ink image on a surface of a transfer member 12, (also referred to as a blanket or receiving member or image member) and then transfers the ink image to media passing through a nip 18 formed with the transfer member 12. The printer 10 includes a frame 11 that supports directly or indirectly operating subsystems and components, which are described below. The printer 10 includes the transfer member 12 that is shown in the form of a drum, but can also be configured as a supported endless belt. The transfer member 12 has an outer surface 21. The outer surface 21 is movable in a direction 16, and on which ink images are formed. A transfix roller 19 rotatable in the direction 17 is loaded against the surface 21 of transfer member 12 to form a transfix nip 18, within which ink images formed on the surface 21 are transfixed onto a media sheet 49.

The transfer member 12 or blanket is formed of a material having a relatively low surface energy to facilitate transfer of the ink image from the surface 21 of the transfer member 12 to the media sheet 49 in the nip 18. Such materials are described in more detail below. A surface maintenance unit (SMU) 92 removes residual ink left on the surface of the blanket 21 after the ink images are transferred to the media sheet 49.

The SMU 92 can include a coating applicator having a reservoir with a fixed volume of coating material and a resilient donor roller, which can be smooth or porous and is rotatably mounted in the reservoir for contact with the coating material. The donor roller can be an elastomeric roller made of a material such as anilox. The coating material is applied to the surface of the blanket 21 to form a thin layer on the blanket surface. The SMU 92 is operatively connected to a controller 80, described in more detail below, to enable the controller to operate the donor roller, metering blade and cleaning blade selectively to deposit and distribute the coating material onto the surface of the blanket and remove un-transferred ink pixels from the surface 21 of the blanket or transfer member 12.

Continuing with the general description, the printer 10 includes an optical sensor 94A, also known as an image-on-drum ("IOD") sensor, that is configured to detect light reflected from the surface 21 of the transfer member 12 and the coating applied to the surface 21 as the member 12 rotates past the sensor. The optical sensor 94A includes a linear array of individual optical detectors that are arranged in the cross-process direction across the surface 21 of the transfer member 12. The optical sensor 94A generates digital image data corresponding to light that is reflected from the surface 21. The optical sensor 94A generates a series of rows of image data, which are referred to as "scanlines," as the transfer member 12 rotates in the direction 16 past the optical sensor 94A. In one embodiment, each optical detector in the optical sensor 94A further comprises three sensing elements that are sensitive to frequencies of light corresponding to red, green, and blue (RGB) reflected light colors. The optical sensor 94A also includes illumination sources that shine red, green, and blue light onto the surface 21. The optical sensor 94A shines complementary colors of light onto the image receiving surface to enable detection of different ink colors using the RGB elements in each of the photodetectors. The image data generated by the optical sensor 94A is analyzed by the controller 80 or other processor in the printer 10 to identify the thickness of ink image and wetting enhancement coating (explained in more detail below) on the surface 21 and the area coverage. The thickness and coverage can be identified from either specular or diffuse light reflection from the blanket surface and coating. Other optical sensors, such as 94B, 94C, and 94D, are similarly configured and can be located in different locations around the surface 21 to identify and evaluate other parameters in the printing process, such as missing or inoperative inkjets and ink image formation prior to image drying (94B), ink image treatment for image transfer (94C), and the efficiency of the ink image transfer (94D). Alternatively, some embodiments can include an optical sensor to generate additional data that can be used for evaluation of the image quality on the media (94E).

The printer 10 also can include a surface energy applicator 120 positioned next to the surface 21 of the transfer member 12 at a position immediately prior to the surface 21 entering the print zone formed by printhead modules 34A-34D. The surface energy applicator 120 can be, for example, corona discharge unit, an oxygen plasma unit or an electron beam unit. The surface energy applicator 120 is configured to emit an electric field between the applicator 120 and the surface 21 that is sufficient to ionize the air between the two structures and apply negatively charged particles, positively charged particles, or a combination of positively and negatively charged particles to the surface 21 or the transfer member. The electric field and charged particles increase the surface energy of the blanket surface and are described in more detail below. The increased surface energy of the surface 21 or transfer member 12 enables the ink drops subsequently ejected by the printheads in the modules 34A-34D to adhere to the surface 21 or transfer member 12 and coalesce.

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. This regulation of the air flow helps prevent evaporated solvents and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed.

The high-speed aqueous ink printer 10 also includes an aqueous ink supply and delivery subsystem 20 that has at least one source 22 of one color of aqueous ink. Since the illustrated printer 10 is a multicolor image producing machine, the ink delivery system 20 includes four (4) sources 22, 24, 26, 28, representing four (4) different colors CYMK (cyan, yellow, magenta, black) of aqueous inks. In the embodiment of FIG. 1, the printhead system 30 includes a printhead support 32, which provides support for a plurality of printhead modules, also known as print box units, 34A through 34D. Each printhead module 34A-34D effectively extends across the width of the intermediate transfer member 12 and ejects ink drops onto the surface 21. A printhead module can include a single printhead or a plurality of printheads configured in a staggered arrangement. Each printhead module is operatively connected to a frame (not shown) and aligned to eject the ink drops to form an ink image on the surface 21. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 10 includes four printhead modules 34A-34D, each of which has two arrays of printheads, alternative configurations include a different number of printhead modules or arrays within a module.

After the printed image on the surface 21 exits the print zone, the image passes under an image dryer 130. The image dryer 130 includes an infrared heater 134, a heated air source 136, and air returns 138A and 138B. The infrared heater 134 applies infrared heat to the printed image on the surface 21 of the transfer member 12 to evaporate water or solvent in the ink. The heated air source 136 directs heated air over the ink to supplement the evaporation of the water or solvent from the ink. The air is then collected and evacuated by air returns 138A and 138B to reduce the interference of the air flow with other components in the printing area.

As further shown, the printer 10 includes a recording media supply and handling system 40 that stores, for example, one or more stacks of paper media sheets of various sizes. The recording media supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut media sheets 49, for example. The recording media supply and handling system 40 also includes a substrate handling and transport system 50 that has a media pre-conditioner assembly 52 and a media post-conditioner assembly 54. The printer 10 includes an optional fusing device 60 to apply additional heat and pressure to the print medium after the print medium passes through the transfix nip 18. In one embodiment, the fusing device 60 adjusts a gloss level of the printed images that are formed on the print medium. In the embodiment of FIG. 1, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to the image receiving member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image data for an image to be produced are sent to the controller 80 from either the scanning system 76 or via the online or work station connection 90 for processing and generation of the printhead control signals output to the printhead modules 34A-34D. Additionally, the controller 80 determines and/or accepts related subsystem and component controls, for example, from operator inputs via the user interface 86, and accordingly executes such controls. As a result, aqueous ink for appropriate colors are delivered to the printhead modules 34A-34D. Additionally, pixel placement control is exercised relative to the surface 21 to form ink images corresponding to the image data, and the media, which can be in the form of media sheets 49, are supplied by any one of the sources 42, 44, 46, 48 and handled by recording media transport system 50 for timed delivery to the nip 18. In the nip 18, the ink image is transferred from the surface 21 of the transfer member 12 to the media substrate within the transfix nip 18.

In some printing operations, a single ink image can cover the entire surface 21 (single pitch) or a plurality of ink images can be deposited on the surface 21 (multi-pitch). In a multi-pitch printing architecture, the surface 21 of the transfer member 12 (also referred to as image receiving member) can be partitioned into multiple segments, each segment including a full page image in a document zone (i.e., a single pitch) and inter-document zones that separate multiple pitches formed on the surface 21. For example, a two pitch image receiving member includes two document zones that are separated by two inter-document zones around the circumference of the surface 21. Likewise, for example, a four pitch image receiving member includes four document zones, each corresponding to an ink image formed on a single media sheet, during a pass or revolution of the surface 21.

Once an image or images have been formed on the surface under control of the controller 80, the illustrated inkjet printer 10 operates components within the printer to perform a process for transferring and fixing the image or images from the surface 21 to media. In the printer 10, the controller 80 operates actuators to drive one or more of the rollers 64 in the media transport system 50 to move the media sheet 49 in the process direction P to a position adjacent the transfix roller 19 and then through the transfix nip 18 between the transfix roller 19 and the surface 21 of transfer member 12. The transfix roller 19 applies pressure against the back side of the recording media 49 in order to press the front side of the recording media 49 against the surface 21 of the transfer member 12. Although the transfix roller 19 can also be heated, in the embodiment of FIG. 1, the transfix roller 19 is unheated. Instead, the pre-heater assembly 52 for the media sheet 49 is provided in the media path leading to the nip. The pre-conditioner assembly 52 conditions the media sheet 49 to a predetermined temperature that aids in the transferring of the image to the media, thus simplifying the design of the transfix roller. The pressure produced by the transfix roller 19 on the back side of the heated media sheet 49 facilitates the transfixing (transfer and fusing) of the image from the transfer member 12 onto the media sheet 49.

The rotation or rolling of both the transfer member 12 and transfix roller 19 not only transfixes the images onto the media sheet 49, but also assists in transporting the media sheet 49 through the nip. The transfer member 12 continues to rotate to continue the transfix process for the images previously applied to the coating and blanket 21.

As shown and described above the transfer member 12 or image receiving member initially receives the ink jet image. After ink drying, the transfer member 12 releases the image to the final print substrate during a transfer step in the nip 18. The transfer step is improved when the surface 21 of the transfer member 12 has a relatively low surface energy. However, a surface 21 with low surface energy works against the desired initial ink wetting (spreading) on the transfer member 12. Unfortunately, there are two conflicting requirements of the surface 21 of transfer member 12. The first aims for the surface to have high surface energy causing the ink to spread and wet (i.e. not bead-up). The second requirement is that the ink image once dried has minimal attraction to the surface 21 of transfer member 12 so as to achieve maximum transfer efficiency (target is 100%), this is best achieved by minimizing the surface 21 surface energy.

In transfix processes, as shown in FIG. 1, an aqueous ink at room temperature (i.e., 20-27° C.) is jetted by onto the surface of transfer member 12, also referred to as a blanket. After jetting, the transfer member 12 moves to a heater zone 136 where the ink is dried and then the dried image is transfixed onto recording medium 49 in transfix nip 19. The transfer member 12 is also referred to as intermediate media, blanket, intermediate transfer member and imaging member.

The transfer member 12 can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt. The transfer member 12 can be a single layer or multiple layers.

Disclosed herein is an intermediate transfer member (ITM) material composite which includes an elastomeric matrix with copper and carbon nano tubes dispersed within the elastomeric matrix for improved spreading of ink. The material helps in better spreading of aqueous ink and pinning Examples of materials used for as the elastomeric matrix in transfer member 12 include silicones, fluorosilicones, polytetrafluoroethylene and some hybrid materials. Fluorosilicones and silicones include room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning.

Other examples of the materials suitable for use as a transfer member 12 include fluoroelastomers. A fluoroelastomer or fluoro rubber of the polymethylene type uses vinylidene fluoride as a co-monomer and has substituent fluoro, alkyl, perfluoroalkyl, or perfuoroalkoxy groups on the polymer chain. Fluoroelastomers are categorized under the ASTM D1418, and have the ISO 1629 designation FKM. Examples of known fluoroelastomers are (1) a class of copolymers of two of vinylidenefluoride, hexafluoropropylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, perfluoromethylvinylether (PMVE) known commercially as VITON GH or VITON GF.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The loading of the copper particles in the in the transfer member is from about is 1 percent to about 30 percent by weight of the transfer member. In embodiments the loading of the copper particles is from about 5 percent by weight to about 25 percent by weight, or from about 10 percent by weight to about 20 percent by weight. The diameter of the copper particles is from about 1 nm to about 8 microns or from about 50 nm to about 700 nm or from about 100 nm to about 500 nm. Copper particles are available from Ames Goldsmith. C1-1000, C1-2000, C1-6000F are examples. In addition, copper flake is suitable in embodiments, and has a face size of approximately 6 microns.

The loading of the carbon nanotubes in the in the transfer member is from about is 1 percent to about 10 percent by weight of the transfer member. In embodiments the loading of the carbon nanotubes is from about 1.5 percent by weight to about 8 percent by weight, or from about 2 percent by weight to about 6 percent by weight. The length of the carbon nanotubes is from about 1 micron to about 20 microns or from about 2 microns to about 15 microns or from about 5 microns to about 10 microns. The diameter of the carbon nanotubes is from about 1 nm to about 20 nm or from about 1 nm to about 10 microns or from about 2 nm to about 5 nm. Carbon nanotubes can be obtained from Cheaptubes.com.

It is also understood that other filler materials or additives may also be added to such a elastomeric matrix of the transfer member 12 in order to achieve even further improved wetting and release properties relative to physical, chemical, thermal, and/or electrical properties. These added fillers may be organic, inorganic or metallic in nature; as well as on micron or nano-scale in size. The additives are selected from the group consisting of iron oxide, magnesium oxide, aluminum oxide and zirconium oxide.

The copper particles and carbon nanotubes (CNTs) are incorporated into the elastomeric matrix. The required amount of the compounded polymer/filler material is dissolved thoroughly in an appropriate solvent, after which additional chemical curatives such as an aminosilane can be added. The reaction mixture can be used in spray coating, flow coating, injection molding, or another suitable method to form a surface on an intermediate transfer member.

Contact angle measurements are an effective way characterize a transfer blanket surface, as the metrics help depict how the aqueous ink will wet out on the surface, and transfer to another surface, in embodiments, the contact angle of the ink on the intermediate blanket is from about 25° to about 40°, or from about 29° to about 36°, or from about 30° to about 35°.

Other properties have been analyzed in regard to the copper/CNT compounded elastomer transfer blanket, such as tensile, elongation, initial modulus, and toughness. It is understood that material properties such as hardness are relevant, as a blanket material must be conformable to create the desired image quality generation when the blanket and ink are pressed within the nip.

Overall the durometer of the single or multilayer blanket is important, as the increasingly conformable nature of the blanket can improve pressure on individual or localized areas of ink, increasing the transfer efficiency with more contact between paper and ink in the transfer nip In embodiments, the transfer member 12 can have a thickness of from about 20 micron to about 5 mm, or from about 100 microns to about 4 mm, or from about 500 microns to about 3 mm.

The ink compositions that can be used with the present embodiments are aqueous-dispersed polymer or latex inks Such inks are desirable to use since they are water-based inks that are said to have almost the same level of durability as solvent inks. In general, these inks comprise one or more polymers dispersed in water. The inks disclosed herein also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof. The dye is present in the ink composition in any desired or effective amount, in one embodiment from about 0.05 to about 15 percent by weight of the ink, in another embodiment from about 0.1 to about 10 percent by weight of the ink, and in yet another embodiment from about 1 to about 5 percent by weight of the ink, although the amount can be outside of these ranges.

Examples of suitable pigments include black pigments, white pigments, cyan pigments, magenta pigments, yellow pigments, or the like. Further, pigments can be organic or inorganic particles. Suitable inorganic pigments include, for example, carbon black. However, other inorganic pigments may be suitable, such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW 18, FW 5160, FW 5170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

Within the ink compositions disclosed herein, the pigment is present in any effective amount to achieve the desired degree of coloration, in one embodiment in an amount of from about 0.1 to about 15 percent by weight of the ink, in another embodiment from about 1 to about 10 percent by weight of the ink, and in yet another embodiment from about 2 to about 7 percent by weight of the ink, although the amount can be outside these ranges.

The inks disclosed herein also contain a surfactant. Any surfactant that forms an emulsion of the polyurethane elastomer in the ink can be employed. Examples of suitable surfactants include anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurote, polyoxyethylene stearyl ether, polyoxyethylene nonylphenyl ether, dialkylphenoxy poly (ethyleneoxy) ethanol, available from Rhone-Poulenc as IGEPAL CA-210™ IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC PE/F, such as SYNPERONIC PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ available from Daiichi Kogyo Seiyaku, combinations thereof, and the like. Other examples of suitable anionic surfactants include DOW-FAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzene-alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used. The surfactant is present in any desired or effective amount, in one embodiment at least about 0.01 percent by weight of the ink, and in one embodiment no more than about 5 percent by weight of the ink, although the amount can be outside of these ranges. It should be noted that the surfactants are named as dispersants in some cases.

Other optional additives to the inks include biocides, fungicides, pH controlling agents such as acids or bases, phosphate salts, carboxylates salts, sulfite salts, amine salts, buffer solutions, and the like, sequestering agents such as EDTA (ethylene diamine tetra acetic acid), viscosity modifiers, leveling agents, and the like, as well as mixtures thereof The inks described herein are further illustrated in the following examples. All parts and percentages are by weight unless otherwise indicated.

Specific embodiments will now be described in detail. These examples are intended to be illustrative, and not limited to the materials, conditions, or process parameters set forth in these embodiments. All parts are percentages by solid weight unless otherwise indicated.

Examples

Figure 2:
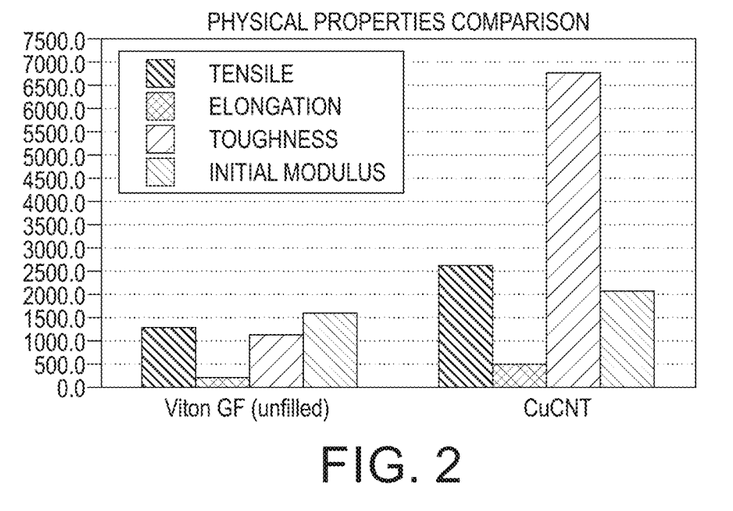
FIG. 2 shows a comparison of physical properties between a fluoroelastomer intermediate transfer member and a fluoroelastomer having copper particles and carbon nanotubes dispersed in the fluoroelastomer.

Various substrates were used as substrates for jetting of aqueous inks images. An intermediate transfer member 12 of a fluoroelastomer material (Viton GF®) and an intermediate transfer member fluoroelastomer material (Viton GF®) having copper particles/CNT dispersed therein were compared. FIG. 2 is a comparison of properties of tensile strength, elongation, toughness and initial modulus. The initial modulus of the Viton GF® fluoroelastomer material having copper particles/CNT dispersed therein is approximately 30 percent higher than the unfilled fluoroelastomer. The amount of copper particles in the substrates was 15 part per hundred. The amount of carbon nanotubes was 4 parts per hundred. Hardness can be depicted as being an inversely proportional representation of the modulus This indicates that the copper/CNT filled material is less hard, and will therefore be more conformable when placed within the nip.

FIG. 2 demonstrates that the combination of carbon nanotubes and copper achieves superior wetting performance when compared to an intermediate transfer member of a fluoroelastomer or a fluoroelastomer containing carbon nanotubes. The polymer alone and the polymer with only carbon nanotubes is not sufficient to provide the appropriate surface properties for jetting in an aqueous inkjet printing system.

Figure 3:
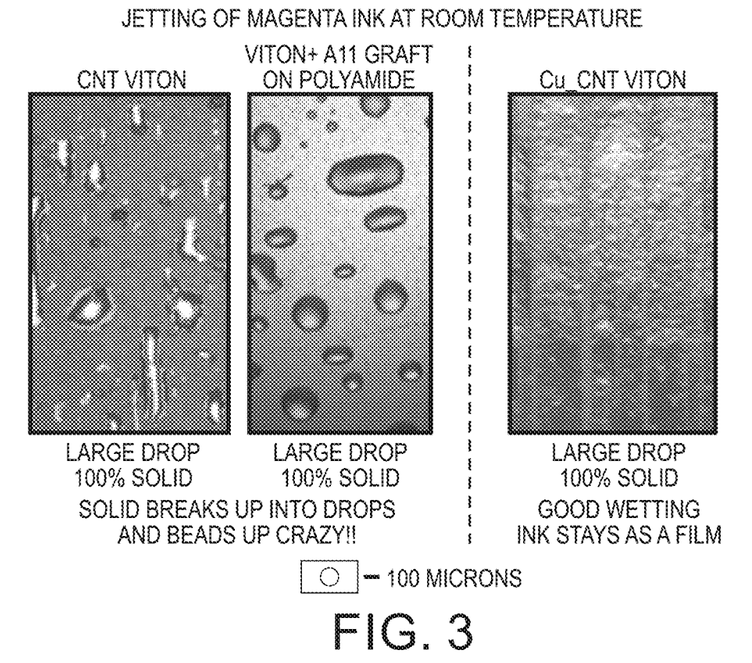
FIG. 3 shows a comparison of magenta ink spreading on an intermediate transfer member of a fluoroelastomer having copper particles and carbon nanotubes dispersed within the fluoroelastomer and an intermediate transfer member of carbon nanotubes (CNT) and Viton and an intermediate transfer member of Viton on polyimide.

FIG. 3 shows a comparison of jetting of magenta ink at room temperature on three different intermediate transfer members. The left most image is an intermediate transfer member of carbon nanotubes and Viton. The middle image is an intermediate transfer member of Viton on polyimide and the right most image is an intermediate transfer member of carbon nanotubes and copper particles and Viton.

Figure 4:
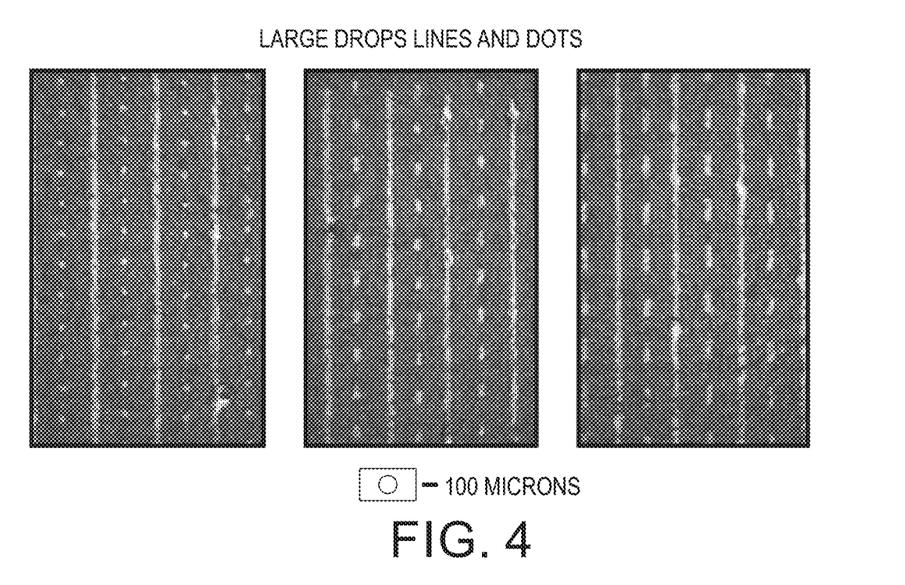
FIG. 4 shows ink droplet spreading on and intermediate transfer member of a fluoroelastomer having copper particles and carbon nanotubes dispersed within the fluoroelastomer for large drops and lines.
Figure 5:
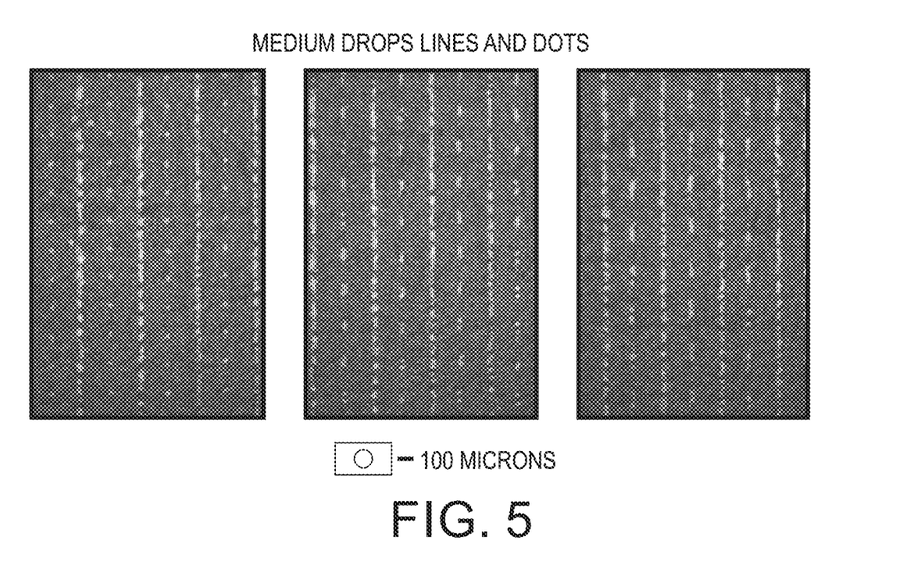
FIG. 5 shows ink droplet spreading on and intermediate transfer member of a fluoroelastomer having copper particles and carbon nanotubes dispersed within the fluoroelastomer for medium drops and lines.
Figure 6:
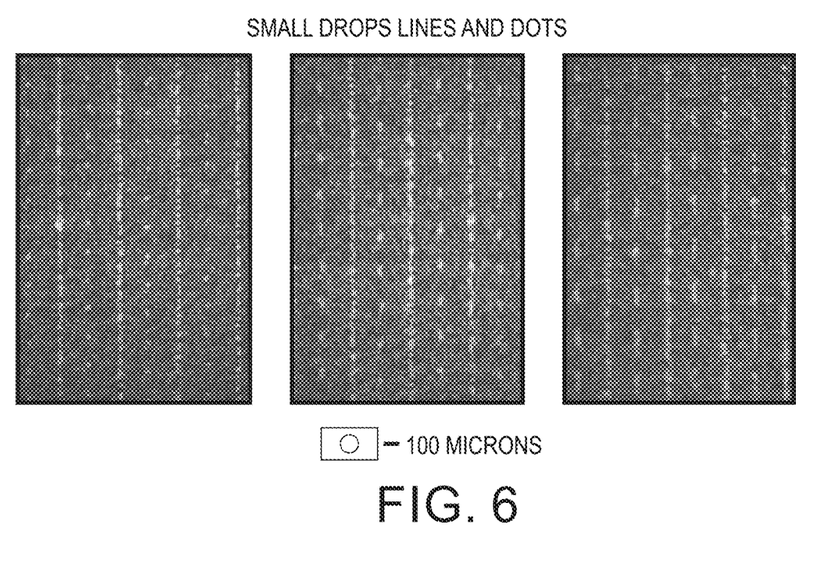
FIG. 6 shows ink droplet spreading on and intermediate transfer member of a fluoroelastomer having copper particles and carbon nanotubes dispersed within the fluoroelastomer for small drops and lines.

FIGS. 4-6 demonstrate the improve wetting characteristics of the transfer member disclosed herein. The transfer member includes a fluoroelastomer having copper particles and carbon nanotubes dispersed therein. The transfer member improves spreading of the aqueous ink and pinning it to the blanket when the ink is wet. The spread ink film on blanket stays as a film instead of film breaking and beading up into small drops. In addition to better spreading and pinning, the dried ink also releases well from the blanket to paper.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A transfer member for use in aqueous ink jet printer, the transfer member comprising: a surface layer having an elastomeric matrix having copper particles and carbon nanotubes dispersed therein, wherein a weight percent of the copper particles in the surface layer is from 1 weight percent to 30 percent and a weight percent of the carbon nanotubes is from 1 weight percent to 10 weight percent.

2. The transfer member of claim 1, wherein the elastomeric matrix is selected from the group consisting of: silicones, fluorosilicones, fluoroplastics and fluoroelastomers.

3. The transfer member of claim 1, wherein the elastomeric matrix is a material selected from the group consisting of: copolymers of two of vinylidenefluoride, hexafluoropropylene, terpolymers of vinylidenefluoride, hexafluoropropylene, and tetrafluoroethylene and tetrapolymers of vinylidenefluoride, hexafluoropropylene, perfluoromethylvinylether (PMVE).

4. The transfer member of claim 1, wherein the surface layer further comprises an additive selected from the group consisting of: iron oxide, magnesium oxide, aluminum oxide and zirconium oxide.

5. The transfer member of claim 1, wherein the copper particles comprise a diameter of from 1 nm to 8 microns.

6. The transfer member of claim 1, wherein the carbon nanotubes have a length of 1 nm to 20 nm.

7. The transfer member of claim 1, wherein the carbon nanotubes have a diameter of from 1 nm to 20 nm.

8. The transfer member of claim 1, wherein the surface layer further comprises aminosilane.

9. The transfer member of claim 1, wherein the transfer member has a thickness of 20 microns to 5 mm.

10. The ink jet printer of claim 9, wherein the surface layer of the transfer member has an aqueous ink contact angle of from 25° to 40°.

11. An ink jet printer comprising:
  a transfer member comprising: a surface layer comprising an elastomeric matrix having copper particles and carbon nanotubes dispersed therein, wherein a weight percent of the copper particles in the surface layer is from 1 weight percent to 30 percent and a weight percent of the carbon nanotubes is from 1 weight percent to 10 weight percent.

12. The ink jet printer of claim 11, wherein the elastomeric matrix is selected from the group consisting of: silicones, fluorosilicones, fluoroplastics and fluoroelastomers.

13. The ink jet printer of claim 11, wherein the elastomeric matrix is a material selected from the group consisting of: copolymers of hexafluoropropylene (HFP) and vinyldiene fluoride (VDF or VF2), terpolymers of tetrafluoroethylene (TFE), vinyldiene fluoride (VDF) and hexafluoropropylene (HFP) and perfluoromethylvinylether (PMVE).

14. The ink jet printer of claim 11, wherein the copper particles have a diameter of from 1 nm to 8 microns.

15. The ink jet printer of claim 11, wherein the carbon nanotubes have a length of 1 nm to 20 nm.

16. The ink jet printer of claim 11, wherein the carbon nanotubes have a diameter of from 1 nm to 20 nm.

17. The ink jet printer of claim 11, wherein the surface layer further comprises aminosilane.

18. The inkjet printer of claim 11, wherein the surface layer further comprises an additive selected from the group consisting of: iron oxide, magnesium oxide, aluminum oxide and zirconium oxide.

19. An ink jet printer comprising:
   a transfer member comprising a surface layer comprising an elastomeric matrix having copper particles and carbon nanotubes dispersed therein, wherein a weight percent of the copper particles in the surface layer is from 1 weight percent to 30 percent and a weight percent of the carbon nanotubes is from 1 weight percent to 10 weight percent;
   a print head adjacent said transfer member for ejecting aqueous ink droplets onto a surface of the transfer member to form an ink image;
   a transfixing station located adjacent said transfer member and downstream from said print head, the transfixing station forming a transfixing nip with the transfer member at said transfixing station; and
   a transporting device for delivering a recording medium to the transfixing nip, wherein the ink image is transferred and fixed to the recording medium.

20. The ink jet printer of claim 19, wherein the surface layer of the transfer member has an aqueous ink contact angle of from 25° to 40°.

* * * * *